April 14, 1925.  
F. COLEMAN  
1,533,390  
APPARATUS FOR HEATING BITUMEN, TAR, AND OTHER SUBSTANCES  
Filed Sept. 15, 1924  3 Sheets-Sheet 3

Inventor:
Frank Coleman
By Kent W. Wournell Atty

Patented Apr. 14, 1925.

1,533,390

UNITED STATES PATENT OFFICE.

FRANK COLEMAN, OF DERBY, ENGLAND.

APPARATUS FOR HEATING BITUMEN, TAR, AND OTHER SUBSTANCES.

Application filed September 15, 1924. Serial No. 737,662.

*To all whom it may concern:*

Be it known that I, FRANK COLEMAN, a subject of the King of Great Britain, of Alfreton Road, Derby, England, have invented certain new and useful Improvements in Apparatus for Heating Bitumen, Tar, and Other Substances, of which the following is a specification.

The object of my invention is to provide a heating apparatus in which the receptacle for the substances to be melted or heated is divided into two or more intercommunicating chambers by means of adjustable partitions or plates in such a manner that the communicating passages between the chambers may be varied so as to suit the material under treatment by adjusting the position of the plates. If one or more chambers be arranged as a charging chamber or chambers into which the solid, or semi-liquid substance is fed then the remaining chamber or chambers will be the main heating and storage chambers into which the substance enters as it attains a sufficiently fluid consistency and from which it is withdrawn as required for use.

The dividing plates may run longitudinally or laterally, I prefer them to be longitudinally disposed, but in any case they are vertical or inclined and the space which is varied or controlled by their adjustment is a space between their lower edges and the bottom of the receptacle which is directly over the furnace or heating flue.

One convenient constructional form of the invention is illustrated in the accompanying drawings.

Figure 1:
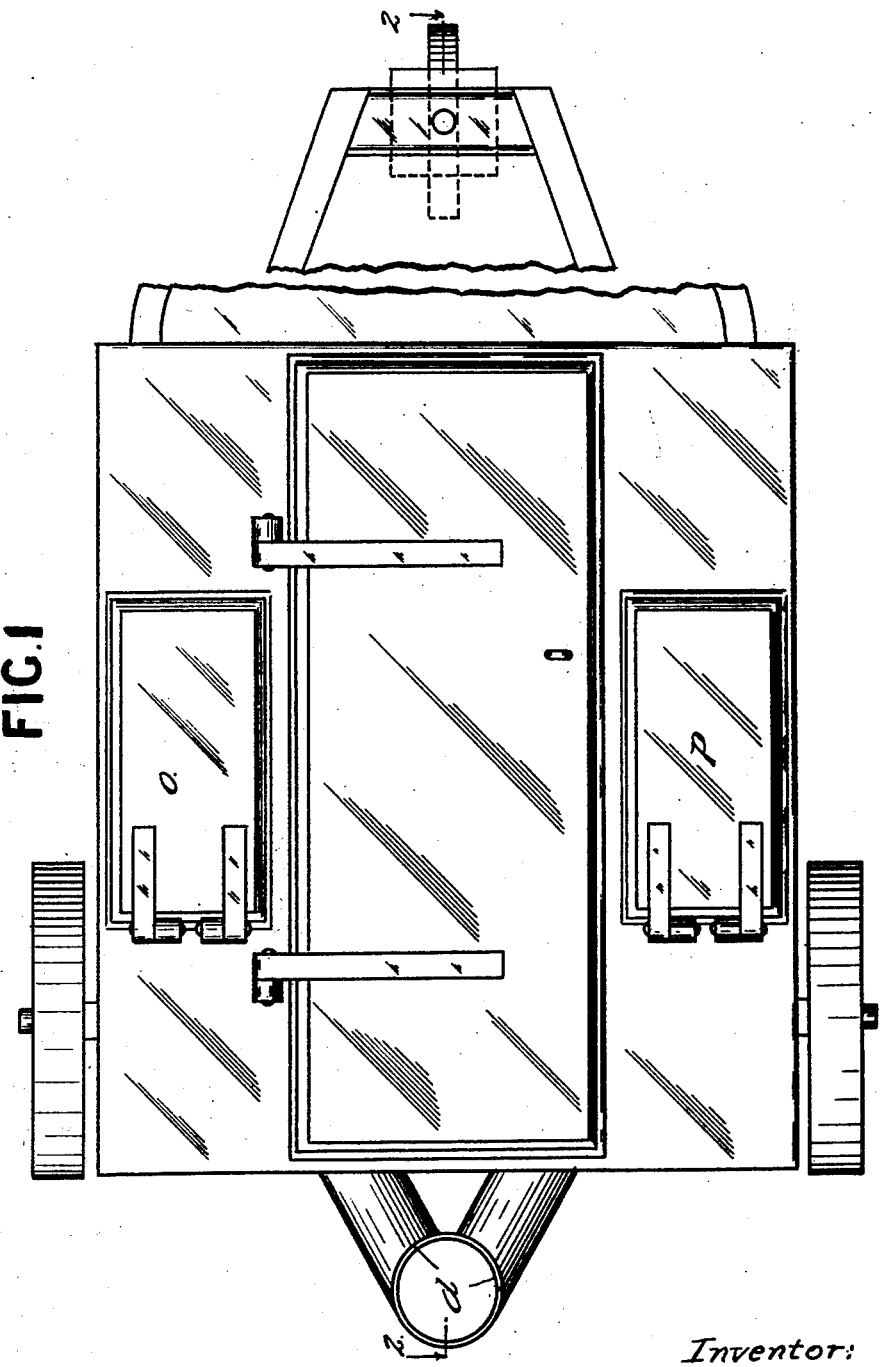
Figure 1 is a plan of the apparatus.
Figure 2:
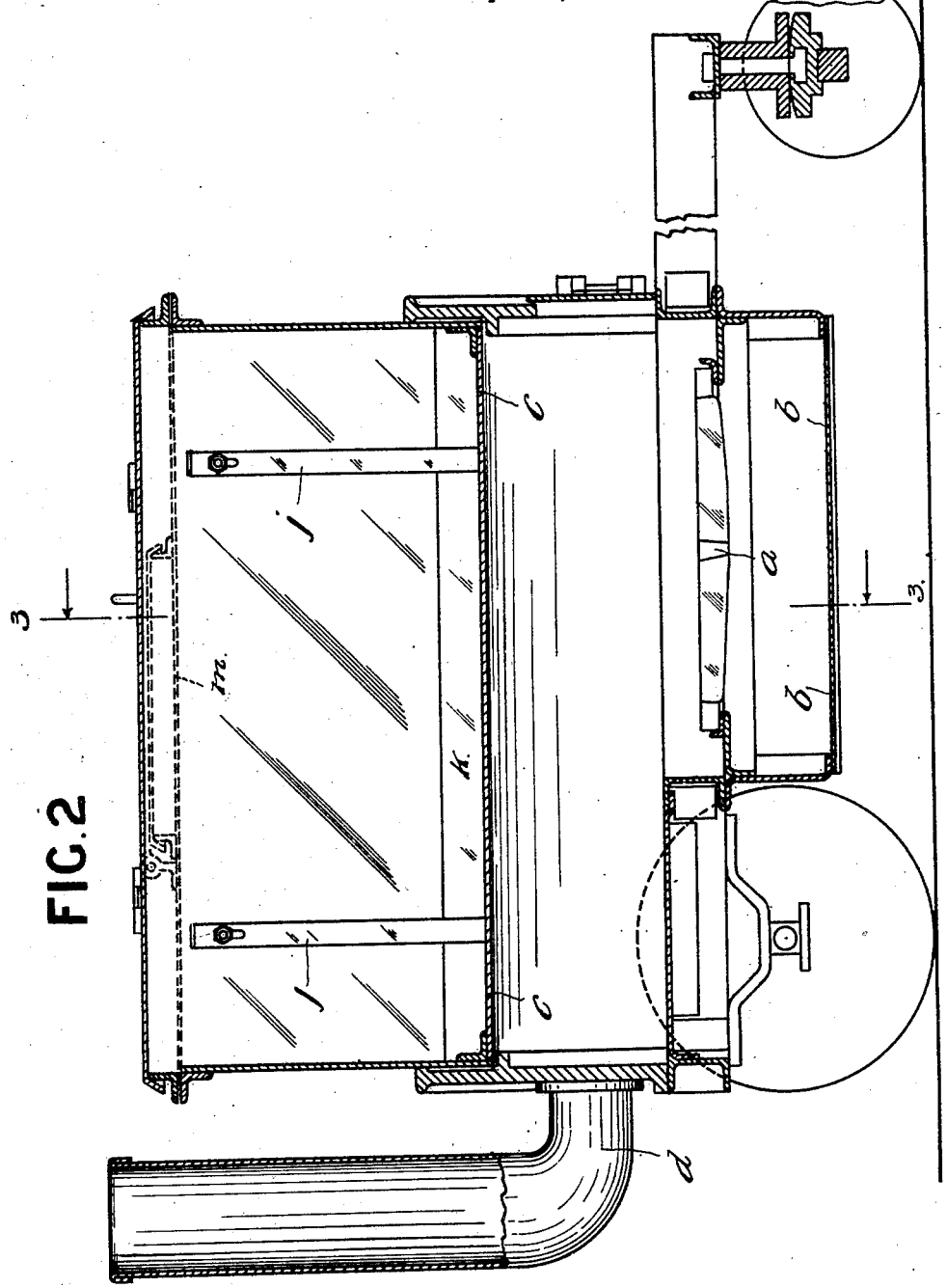
Figure 2, is a longitudinal section on line 2—2 of Fig. 1.
Figure 3:
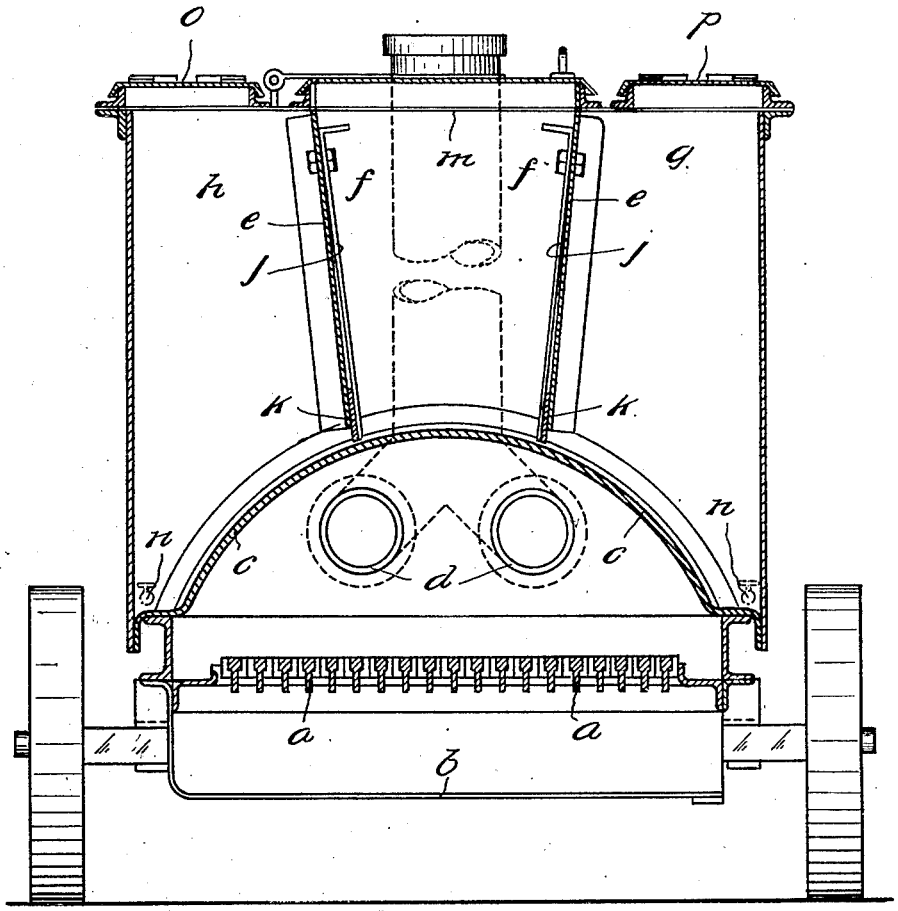
Figure 3, is a transverse section on line 3—3 of Fig. 2.

In this embodiment a receptacle of oblong form is provided at or near one end with a furnace grate $a$. The grate bars are approximately level with the bottom of the receptacle and extend for example for a third or half the length thereof, while in width the grate may conveniently be nearly the full width of the receptacle. Below the grate a plate or tray $b$ may be secured to serve as a cinder or ash tray.

Above the grate an arched plate $c$, extending the full length of the receptacle, is secured to the bottom thereof, and forms the bottom of the liquid chambers, and also forms the heating flue which carries the hot gases from the grate along to the rear end of the apparatus to an outlet $d$ arranged on the end wall.

Above the arched plate $c$, I arrange two longitudinal plates $e$ extending from end to end of the receptacle and inclined slightly to the vertical. The bottom edges of these plates $e$ are spaced above the arched plate and in effect they divide the receptacle into a central chamber $f$, and two side chambers $g$, $h$, the central chamber communicating with the side chambers through the aforesaid spaces between the plates $e$ and the arch $c$.

In the illustrated arrangement the spaces below the plates $e$ may be varied or closed by bars $k$ carried by bars $j$ which are adjustable on the plates $e$ so that they may be raised or lowered as desired.

In the case of bitumen and the more solid substances to be melted we prefer to charge them through the opening $m$ into the central chamber, and to have the strips $k$ partly open, so that the molten material flows from the lumps charged into the chamber $f$ through the openings below the plates $e$ into the side chambers $g$ and $h$ where draw-off cocks such as $n$ are provided.

With tar and lighter materials the side chambers may be charged through the doors $o$, $p$, and the strips $k$ may be raised to open the passages below $e$ so that the central chamber may serve for the molten liquid to boil up in, and so prevent the ebullition of gas causing the liquid charged into the side chambers to boil over before the whole mass is heated.

I claim:

1. Apparatus for heating bitumen, tar, and other substances, comprising in combination a liquid container, means for heating said container, divisional walls in said container forming a number of chambers, communicating passages between said chambers and adjustable means for controlling said passages.

2. Apparatus for heating bitumen, tar, and other substances, comprising in combination a liquid container, means for heating said container, divisional walls in said container forming a number of chambers, separate charging apertures for said chambers, communicating passages between said chambers and adjustable means for controlling said passages.

3. Apparatus for heating bitumen, tar, and other substances, comprising in combination a liquid container, means for heating said container, divisional walls in said container forming a number of chambers, communicating passages between said chambers and adjustable means for controlling said passages, said means comprising sliding strips mounted on the divisional walls.

4. Apparatus for heating bitumen, tar, and other substances, comprising in combination a liquid container, a furnace below said container, said container having an arched floor separating said container from said furnace, longitudinal walls in said container dividing it into a number of chambers, said walls terminating some distance above said arched floor and with an adjustable extension to leave communicating passages between said chambers.

5. Apparatus for heating bitumen, tar, and other substances, comprising in combination a liquid container, a furnace below said container, said container having an arched floor separating said container from said furnace, longitudinal walls in said container dividing it into a number of chambers of which the outer ones are of greatest depth, separate charging apertures for said chambers, said walls terminating some distance from said arched floor and having adjustable means at the bottom to leave variable communicating passages between said chambers.

6. Apparatus for heating bitumen, tar, and other substances, comprising in combination a liquid container, a furnace below said container, said container having an arched floor separating said container from said furnace, longitudinal walls in said container dividing it into a number of chambers, said walls terminating some distance from said arched floor to leave communicating passages between said chambers, and adjustable means for controlling said passages.

7. Portable apparatus for heating bitumen, tar, and other substances, comprising in combination a wheeled chassis, a furnace secured on said chassis, a liquid container secured on said chassis above said furnace, said container having an arched floor separating said container from said furnace, longitudinal walls in said container dividing it into a number of chambers of which the outer one are of greatest depth, said walls terminating some distance from said arched floor and having an adjustable extension to leave variable communicating passages between said chambers.

8. Portable apparatus for heating bitumen, tar, and other substances, comprising in combination a wheeled chassis, a furnace secured on said chassis, a liquid container secured on said chassis above said furnace, said container having an arched floor separating said container from said furnace, longitudinal walls in said container dividing it into a number of chambers, said walls terminating some distance from said arched floor to leave communicating passages between said chambers, and adjustable means for controlling said passages, said means being mounted on said divisional walls.

In testimony whereof I affix my signature.

FRANK COLEMAN.